United States Patent [19]

Klein et al.

[11] Patent Number: 4,533,078
[45] Date of Patent: Aug. 6, 1985

[54] WELDING AND/OR CUTTING TORCH

[75] Inventors: Werner Klein, Frankfurt; Heinz Leo, Friedrichsdorf, both of Fed. Rep. of Germany

[73] Assignee: Messer Griesheim GmbH, Fed. Rep. of Germany

[21] Appl. No.: 475,731

[22] Filed: Mar. 16, 1983

[30] Foreign Application Priority Data

Apr. 21, 1982 [DE] Fed. Rep. of Germany ....... 3214717

[51] Int. Cl.³ .............................................. F16H 57/00
[52] U.S. Cl. ......................................... 228/45; 266/76; 74/405; 192/141; 192/150
[58] Field of Search ................... 228/45; 192/141, 143, 192/150; 74/405, 412 TA; 266/76

[56] References Cited

U.S. PATENT DOCUMENTS

| 1,258,302 | 3/1918 | Bendix | 74/7 |
| 2,249,413 | 7/1941 | Bechtle | 266/76 |
| 2,502,573 | 4/1950 | Lee | 192/141 |
| 2,747,152 | 5/1956 | Greene | 266/76 |
| 4,098,138 | 7/1978 | Miller | 74/405 |

Primary Examiner—Kenneth J. Ramsey
Assistant Examiner—K. Rowan
Attorney, Agent, or Firm—Connolly and Hutz

[57] ABSTRACT

A vertically movable welding and/or cutting torch is automatically disconnected from its drive when the torch bumps into a work piece.

2 Claims, 4 Drawing Figures

WELDING AND/OR CUTTING TORCH

BACKGROUND OF INVENTION

The invention relates to a welding and/or cutting torch with an appropriate mounting and drive installation for its vertical operation.

When used in a flame cutting machine, these torches must be mounted on the flame cutting machine movable in vertical direction so that they can be positioned each time at an optimum distance to the work pieces having a different height or thickness. In this case, the vertical movement of the torch does not take place manually, but by means of a motor.

In order to prevent the torch with its mounting construction from bumping into the work piece to be machined during its downward movement, safety devices are provided. For example, capacitive sensing devices are used to determine the distance of the work piece from the torch tip. When these safety devices fail, the torch bumps unrestrictedly against the work piece with all the related disadvantageous consequences for torch and torch mounting.

SUMMARY OF INVENTION

An object of the invention is to safeguard torches of the above-mentioned type against the disadvantageous consequences related to the unintentional bumping against the work piece to be machined in such a way that the corresponding safety device is extensively troublefree but, nevertheless, meets the operating requirements.

The advantage obtained with the invention resides in particular in the only slightly higher costs caused by the safety construction.

THE DRAWINGS

DETAILED DESCRIPTION

Figure 1:
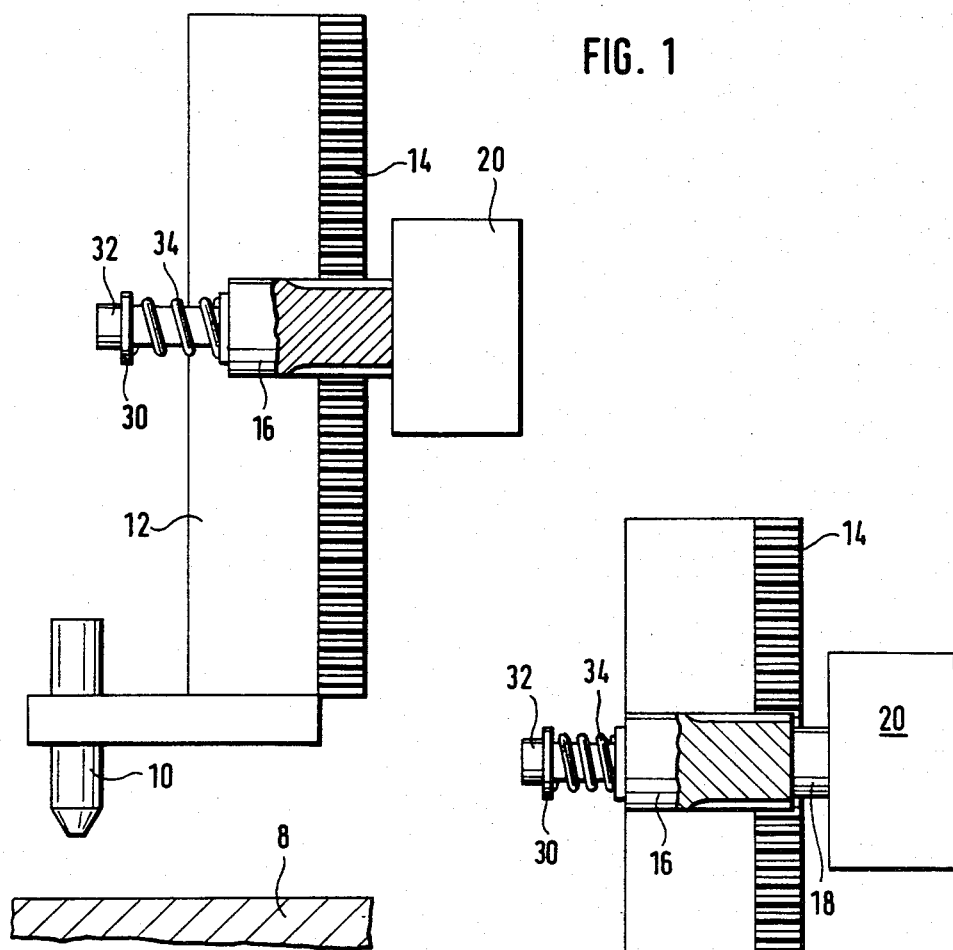
FIG. 1 shows a side view of the construction according to the invention in a first operating position.

A torch 10 for cutting a work piece 8 is fastened to a flame cutting machine (not shown). A torch mounting 12 is used to guide the torch 10 and has a gear rack 14 which meshes with a pinion 16 movable in vertical direction.

Pinion 16 is set in a rotating motion by a shaft 18 which in turn is driven by a motor 20. The frictional connection between the pinion 16 and the shaft 18 necessary for transferring the rotating motion is achieved by a union of pinion 16 and shaft 18. For this purpose, the pinion 16 has an inside thread 24 in a partial longitudinal zone "a" which is engaged with a corresponding outside thread 26 of the shaft 18 provided in a partial longitudinal zone "b".

The shaft 18 has a projection 28 at its front end opposite the motor 20 to which projection a bracket plate 30 is fastened in the center at the front end by means of a screw 32. The projection 28 has a smaller cross section than the shaft 18 so that at the transition from projection 28 to shaft 18 the shaft has a shoulder 36. The pinion 16 is pressed against this shoulder 36 by means of a spring 34 with a disc 38 directed inward to the shaft 18 (see FIG. 2).

Figure 2:
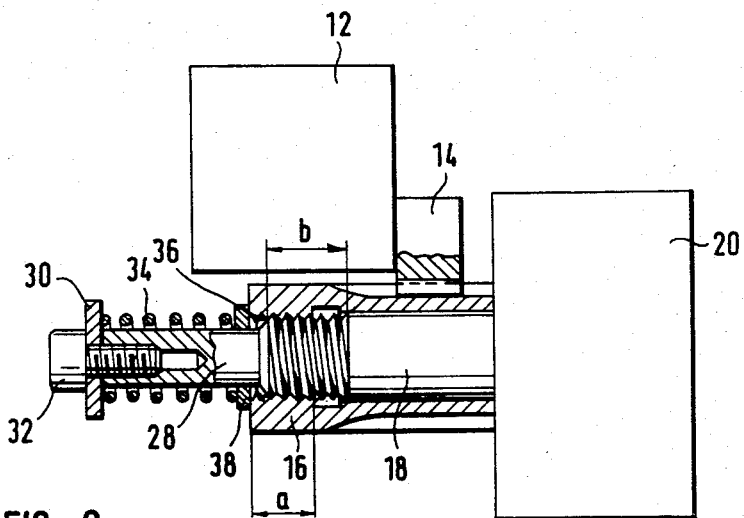
FIG. 2 is a plan view of the construction according to FIG. 1 partially shown as a sectional view.

The inherent weight of the torch 10 and the torch mounting 12 assures that the pinion 16 remains fully screwed on the shaft 18. This applies to the downward motion as well as to the upward motion of the torch 10 not touching the work piece along the gear rack 14 (FIGS. 1 and 2).

As soon as the torch 10 for whatever reason bumps into the work piece 8, the pressure of the work piece 8 affecting the torch 10 as well as the continually rotating shaft 18 assures that the pinion 16 loosens from the shaft 18, in other words, the union "a" is released from the union "b". A downward directed force by the torch 10 on the work piece 8 with the harmful consequences for torch and torch mounting 12 is no longer applied in spite of the fact that the drive motor 20 is not turned off.

Figure 3:
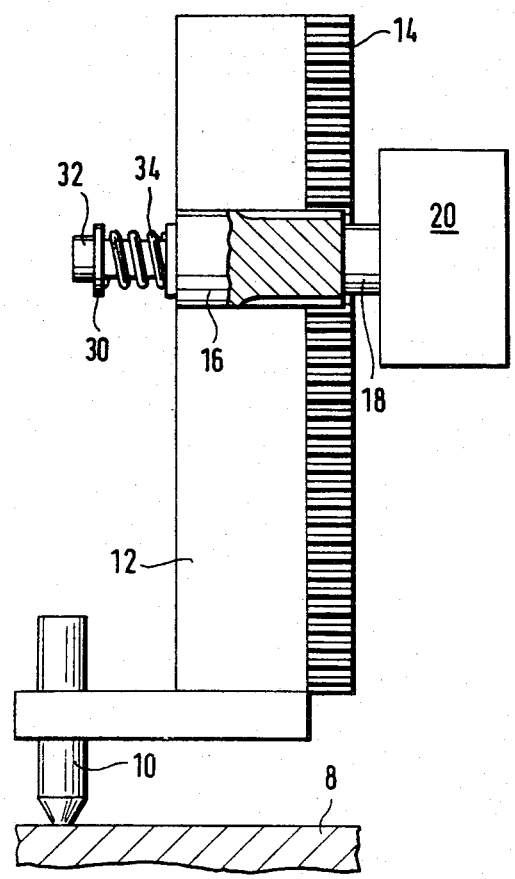
FIG. 3 is a side view of the construction according to the invention in a second operating position.
Figure 4:
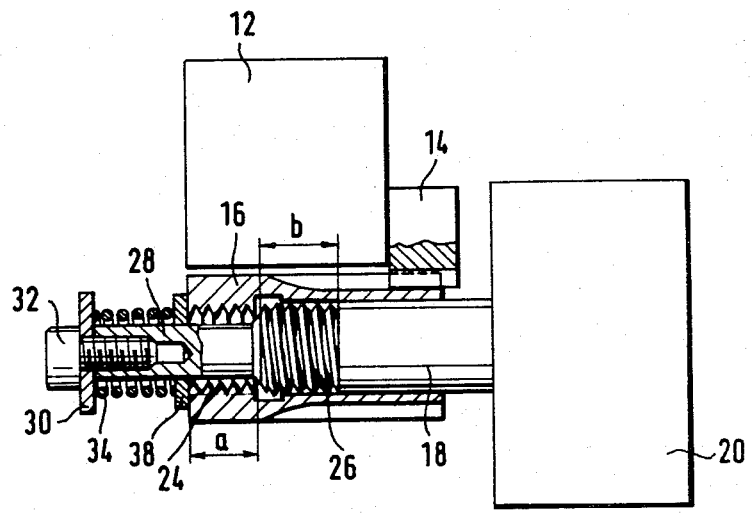
FIG. 4 is a plan view of the construction according to FIG. 3 partially shown as a sectional view.

When this union between pinion 16 and shaft 18 is released, the pinion 16 changes its horizontal position on the shaft 18 to the extent of zone "a" or "b" in the direction of the bracket plate 30 (FIGS. 3 and 4). As a result, the spring 34 is increasingly compressed.

After reversing the drive motor 20 with the result that the shaft 18 now is displaced in reverse direction, the compressive force of the spring 34 affecting the pinion 16 in its longitudinal direction assures that the pinion 16 with its thread 24 remains in screwing contact with the thread 26 of the shaft 18 so that subsequently the pinion 16 fully screws again on the shaft 18 and assumes its position shown in FIG. 2.

Reversal of the motor 20 can take place, for example, by means of a switch actuated by the horizontal displacement of the pinion 16 on the shaft 18.

Other procedures taking place simultaneously with flame cutting can be included at the same time in the switching arrangement, corresponding to operational requirements. The gas supply needed for flame cutting may be turned off, for example, or a powder supply possibly occurring can be halted. After the torch 10 bumps into the work piece 8, the type and magnitude of possible damage to the torch 10 including its mounting construction 12 can be more easily checked in that case before starting or continuing flame cutting.

After reversal of the motor 20 it is, moreover, also possible to switch off the entire current supply for the flame cutting machine by an additional actuation of a time relay.

SUMMARY

For torches 10 operated automatically in vertical direction on flame cutting machines, the danger exists that they bump into the work piece 8 to be cut when safety devices fail. The resulting damage on the torches 10 and their torch mounting 12 when the torch 10 bumps into a work piece 8 are prevented by automatically disconnecting the torch mounting from the drive 20 driving the torch mounting 12.

What is claimed is:

1. In a welding and/or cutting torch assembly having associated mounting and drive equipment for vertical operation of the torch, the improvement being said mounting including a gear rack and a pinion engaged with said gear rack, said drive equipment including a motor having a shaft, said shaft being externally threaded in its partially longitudinal zone, said pinion being internally threaded in its partial longitudinal zone, said pinion being threadably engaged with said shaft in such a manner that said pinion is selectively connected and disconnected to said shaft whereby said mounting is automatically disconnected from said shaft when said torch bumps into a workpiece with said pinion being disengaged from said shaft.

2. Torch assembly according to claim 1, characterized in that said pinion can be pressed by means of a spring against a shoulder of said shaft in its longitudinal direction.

* * * * *